(12) United States Patent
Hicklin et al.

(10) Patent No.: US 10,119,421 B2
(45) Date of Patent: Nov. 6, 2018

(54) BONDING METHOD

(71) Applicant: ROLLS-ROYCE plc, London (GB)

(72) Inventors: Mark J Hicklin, Derby (GB); Stephen O Osiyemi, Hengelo (NL); Ewan F Thompson, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 15/209,161

(22) Filed: Jul. 13, 2016

(65) Prior Publication Data
US 2017/0044934 A1 Feb. 16, 2017

(30) Foreign Application Priority Data
Aug. 12, 2015 (GB) .................................. 1514221.9

(51) Int. Cl.
F01D 25/24 (2006.01)
B29C 65/18 (2006.01)
(Continued)

(52) U.S. Cl.
CPC ............ F01D 25/243 (2013.01); B29C 65/18 (2013.01); B29C 65/48 (2013.01);
(Continued)

(58) Field of Classification Search
CPC .... F01D 25/243; F01D 25/285; F01D 21/045; F01D 25/24; B29C 65/48; B29C 66/634;
(Continued)

(56) References Cited

U.S. PATENT DOCUMENTS 3,542,152 A * 11/1970 Oxx, Jr. ................. B64D 33/02
181/214
3,996,091 A * 12/1976 Daunt ..................... B29C 33/02
100/211
(Continued)

FOREIGN PATENT DOCUMENTS

AU 2006222661 A1 4/2007
EP 1621752 A2 2/2006
(Continued)

OTHER PUBLICATIONS

Jan. 10, 2017 Search Report issued in European Patent Application No. 16179152.
(Continued)

Primary Examiner — Michael N Orlando
Assistant Examiner — Cynthia L Schaller
(74) Attorney, Agent, or Firm — Oliff PLC

(57) ABSTRACT

A method is provided of bonding a first component to a second component. The method includes: locating the first component against the second component to form an interface between the components, a curable adhesive being provided at the interface; locating a pressurizable, fluid-filled bladder against the first component such that the first component is sandwiched between the second component and the bladder; locating a backing member against the bladder such that the bladder is sandwiched between the backing member and the first component; pressurizing the bladder such that a consolidating pressure is exerted by the bladder on the first component to conform the first component to the second component; and curing the adhesive while the first component is conformed to the second component by the consolidating pressure.

9 Claims, 3 Drawing Sheets

(51) Int. Cl.
  *B29C 65/48* (2006.01)
  *B29C 65/00* (2006.01)
  *F01D 21/04* (2006.01)
  *F01D 25/28* (2006.01)
  *F02C 7/045* (2006.01)
  *B29L 31/30* (2006.01)
  *B29L 31/00* (2006.01)

(52) U.S. Cl.
  CPC ...... *B29C 65/4835* (2013.01); *B29C 66/1122* (2013.01); *B29C 66/53241* (2013.01); *B29C 66/612* (2013.01); *B29C 66/634* (2013.01); *B29C 66/72525* (2013.01); *B29C 66/81433* (2013.01); *B29C 66/81455* (2013.01); *B29C 66/82421* (2013.01); *B29C 66/8322* (2013.01); *F01D 21/045* (2013.01); *F01D 25/24* (2013.01); *F01D 25/285* (2013.01); *F02C 7/045* (2013.01); *B29C 66/7212* (2013.01); *B29C 66/81457* (2013.01); *B29L 2031/3076* (2013.01); *B29L 2031/7504* (2013.01); *F05D 2220/32* (2013.01); *F05D 2230/00* (2013.01); *F05D 2230/23* (2013.01); *F05D 2230/68* (2013.01); *F05D 2260/962* (2013.01)

(58) Field of Classification Search
  CPC ............ B29C 66/612; B29C 66/53241; B29C 66/1122; B29C 66/81433; B29C 66/81455; B29C 66/82421; B29C 66/72525; B29C 65/4835; B29C 66/8322; B29C 65/18; B29C 66/7212; B29C 66/81457; F02C 7/045; F05D 2220/32; F05D 2230/00; F05D 2260/962; F05D 2230/23; F05D 2230/68; B29L 2031/7504; B29L 2031/3076
  See application file for complete search history.

(56) References Cited

U.S. PATENT DOCUMENTS

| | | | |
|---|---|---|---|
| 6,444,071 | B1* | 9/2002 | Ayorinde .............. B29C 53/822 156/155 |
| 2010/0269979 | A1 | 10/2010 | Abitz |
| 2015/0004347 | A1 | 1/2015 | Kline et al. |

FOREIGN PATENT DOCUMENTS

| | | |
|---|---|---|
| EP | 2457718 A2 | 5/2012 |
| EP | 2896494 A2 | 7/2015 |
| FR | 2999974 A1 | 6/2014 |
| GB | 2253917 A | 9/1992 |

OTHER PUBLICATIONS

Feb. 3, 2016 Search Report issued in British Patent Application No. 1514221.9.

* cited by examiner

BONDING METHOD

TECHNICAL FIELD

The present disclosure relates to a method of bonding a first component to a second component, such as, for example, an acoustic liner to a gas turbine engine fan casing.

BACKGROUND

Acoustic liners and abradable liners employed in front and rear fan casings of gas turbine engines. Acoustic liners are typically fabricated using a GRP (Glass Reinforced Plastic) or aluminium perforate skin, aluminium honeycomb and a GRP backing skin. Abradable liners can have a similar construction, but typically have an abradable layer to form a track for the tips of the engine fan blades. These components are bonded together to form the assembly and the assembly is then either bonded or bolted to the casing.

Successful bonding of the assembly to the casing requires the adhesive to be cured under a pressure usually recommended by its manufacturer. This pressure is applied in order to ensure that (i) the entire bonding areas on the surfaces of the mating parts are in contact with the adhesive and (ii) the entrapment of voids and the entrapment volatile gases discharged during the curing of the adhesive are mitigated or eliminated.

Accordingly, "vacuum bagging" may be used to hold the liners at predetermined positions around the curvature of the sides of the fan case and to consolidate the components during the curing of the adhesive. Vacuum bagging can provide any additional pressure that may be needed to bend or conform the relatively flexible liners to the curvature of the fan case.

However vacuum bagging can have the following disadvantages:

When a relatively small component such as an acoustic or abradable liner is bonded to a relatively larger component such as a fan casing, the entire structure of the larger component needs to be completely enclosed by the vacuum bag in order to obtain the necessary vacuum pressure for the consolidation of the components. Thus a considerable amount of vacuum bagging materials e.g. release fabric, breather, perforated film and polyethylene film are required even when the area of interest for the bonding may be much smaller. This can increase the cost of the bonding process.

Usually the polyethylene film used to create the vacuum seal is about 0.15 to 0.3 mm thick. In some cases when one of the components to be bonded is relatively stiff and its curvature does not match that of the corresponding component, the film may not be strong enough to push the mating components together during the curing. In such situations, the polyethylene film stretches or tears instead of performing the consolidation as expected. The strength and the in-service performance of the bonded structure can thus be significantly reduced.

The materials used for the vacuum bagging process care typically used only once before they are disposed. This also increases the cost of the process.

To address these issues, mechanical clamps and fixtures can be used to bend or conform liners to the curvature of the fan casing while the adhesive is curing. However, the assembly of mechanical fixtures is usually cumbersome and time consuming, and increases the risk of producing unintended inflexions in the liner. Also it can be difficult to ensure that equal consolidating pressures are applied to the various locations where the clamps are applied. As a result, there is a high risk that too much (or too little) pressure is applied at specific locations. When too much pressure is applied, the risk of squeezing too much adhesive out of the bonding area increases. In contrast, when too little pressure is applied, the risk of the entrapment of voids and volatile gases in the adhesive region increases significantly.

Another option is to use autoclaving equipment to apply consolidating pressures, but again complete encapsulation of the components is required.

SUMMARY

It would be desirable to provide a bonding method which avoids or mitigates some or all of these disadvantages.

In an aspect there is provided a method of bonding a first component to a second component, the method including:

locating the first component against the second component to form an interface between the components, a curable adhesive being provided at the interface;

locating a pressurisable, fluid-filled bladder against the first component such that the first component is sandwiched between the second component and the bladder;

locating a backing member against the bladder such that the bladder is sandwiched between the backing member and the first component;

pressurising the bladder such that a consolidating pressure is exerted by the bladder on the first component to conform the first component to the second component; and curing the adhesive while the first component is conformed to the second component by the consolidating pressure.

The bladder can allow an even and high consolidating pressure to be exerted across the whole of the first component. However, unlike the conventional vacuum bagging approach, the method does not require time-consuming and expensive encapsulation of both components. Furthermore, the bladder can be reused.

In a further aspect there is provided a method of manufacturing a component, the method including the method of bonding of the previous aspect.

In a yet further aspect there is provided a method of manufacturing a gas turbine engine, including manufacturing one or more of the components using the method of the previous aspect.

The method of any aspect may have any one or, to the extent that they are compatible, any combination of the following optional features.

The fluid can be gas (e.g. air) or liquid (e.g. water, grease or gel).

The method may further include: de-pressurising the bladder and removing the bladder and the backing member from the bonded first and second components.

One bladder or a plurality of side-by-side bladders may be sandwiched between the backing member and the first component.

The bladder may be pressurised by forcing further fluid into the bladder, expansion of the bladder may be constrained by the backing member. In this case, one or more fixtures may hold the backing member relative to the second component such that the backing member may be held at a fixed distance from the second component.

Another option, however, is for the bladder to be pressurised by forcing the backing member, e.g. using a jack, against the bladder to squeeze the bladder between the backing member and the first component.

The method may further include locating a compliant layer between the fluid-filled bladder and the first component. The compliant layer may carry an arrangement of spaced protuberances (e.g. relatively rigid protuberances) which project from the side of the layer facing the first component. The protuberances may concentrate the consolidating pressure exerted by the bladder on the first component at the locations of the protuberances. The protuberances may form a regular array. The compliant layer can be, for example, a rubber sheet. The protuberances can be hard (e.g. rigid plastic or metal) supports (e.g. spheres or hemispheres). The protuberances can be hollow to reduce weight. The protuberances may be rubber coated. One or more supports (e.g. telescopic supports) may extend from the compliant layer to the backing member to hold the compliant layer in position.

The method may further include locating a mould release layer and/or a puncture protection sheet on the first component between the first component and the bladder.

The method may further include locating one or more heating mats adjacent the components, and heating the components during the curing of the adhesive using the mats. For example, a heating mat may be located between the first component and the bladder, and/or a heating mat may be located on the opposite side of the second component to the first component.

The first component may be an acoustic liner or an abradable liner, and the second component may be a gas turbine engine fan casing.

BRIEF DESCRIPTION OF THE DRAWINGS

Embodiments will now be described by way of example with reference to the accompanying drawings in which.

DETAILED DESCRIPTION

Figure 1:
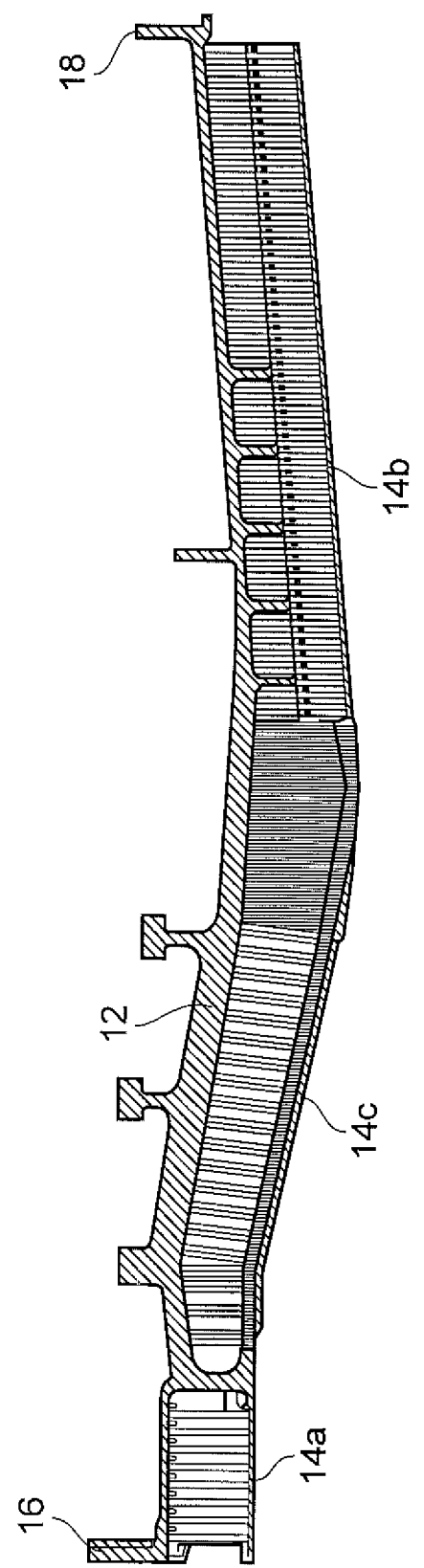
FIG. 1 shows a partial section through a fan casing assembly of a gas turbine engine.

FIG. 1 shows a partial section through a fan casing assembly of a gas turbine engine. The annular fan casing 12 is generally cylindrical or frustoconical in shape. It has a forward flange 16 and a rearward flange 18 attached to further structure of the gas turbine engine, which is not shown. These flanges 16 and 18, and the annulus of the fan casing 12 between them, provide a load path through which mechanical loads may be transmitted during the operation of the gas turbine engine. Within the annular fan casing 12 are secured front acoustic liners 14a, rear acoustic liners 14b and fan track abradable liners 14c. The liners are formed in segments, so that a number of liners are butted together to form a complete ring around the inner surface of the fan casing 12. All of the liners are attached to the fan casing 12 using adhesive.

Figure 2:
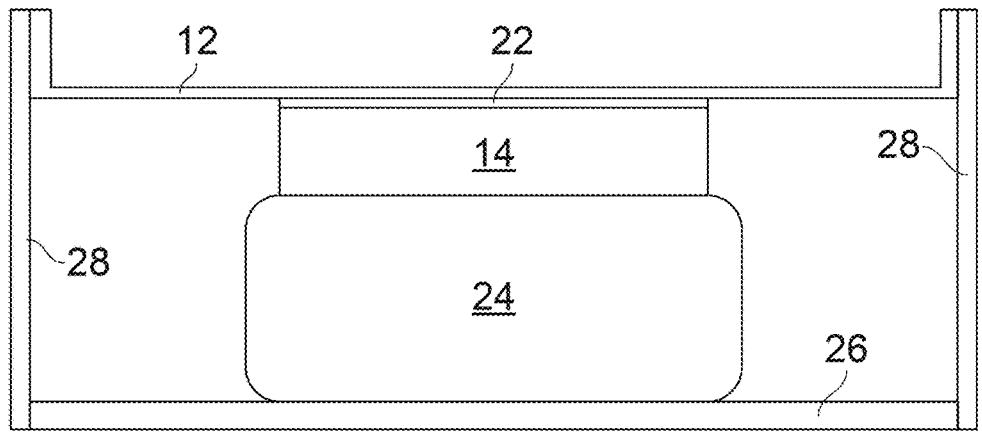
FIG. 2 shows schematically an assembly used in a method of bonding a liner to the fan casing.

FIG. 2 shows schematically an assembly used in a method of bonding a liner 14, such as an acoustic liner or a fan track liner, to the fan casing 12. According to the method, the liner (or group of liners) to be bonded are assembled and/or tacked with a film or paste curable adhesive 22 at a specified position on the fan casing. An inflatable bladder 24 (or a group of side-by-side bladders) and a rigid backing plate 26 are then located against the liner so that the the liner is sandwiched between the casing and the bladder, and the bladder is sandwiched between the backing plate and the liner. The bag can be inflated by injection of pressurised air or any suitable fluid.

One or more fixtures, such as arms 28 each having at one end a rubber-padded hook to hook onto a back surface of the casing 12 and at the other end a bolted joint to the backing plate 26, are provided to hold the backing plate at a fixed distance from the casing. In this way, as the fluid is injected into the bladder, the fixtures ensure that the additional fluid results in the imposition of a consolidating pressure over the liner 14 which conforms the liner to the casing, i.e. by flexing the liner so that it adopts the curvature of the casing.

The bladder is shaped so that its unconstrained fully inflated shape is greater in volume than the volume of the space formed between the backing plate and the liner 12, thereby allowing the bladder when inflated and constrained between the backing plate and the liner to exert the consolidating pressure. However, preferably, the sides of the bladder are shaped to conform at least approximately to the shapes of the mating surfaces of the liner and the back plate. For example, to the extent the liner follows the curvature of the casing, so the mating side of the inflated bladder can be correspondingly curved. Moreover, the bladder preferably completely covers the surface of the liner. By such measures, an even consolidating pressure can be exerted across the whole of the liner. This consolidating pressure can be similar to that obtained using a vacuum bagging procedure.

The adhesive 22 cures under the consolidating pressure from the bladder 24, ensuring that the entire bonding areas of the liner 14 and casing 12 are in contact with the adhesive, and also mitigating or eliminating entrapment of voids and entrapment volatile gases discharged during the curing of the adhesive. Conveniently, however, bagging of the entire casing can be avoided. Moreover, the bladder can be reused. It is also suitable for exerting a high consolidating pressure on a relatively stiff liner.

The consolidating pressure can be controlled during curing by actively injecting or removing fluid from the bladder 24.

The assembly may be mounted on a table with wheels in order to sustain the weight of the bladder 24 and backing plate 26 and to facilitate the movement of the assembly to where it is needed on a shop floor.

Measures can be taken to ensure that any adhesive spew that is squeezed out of the bonding region does not stick to the bladder 24. For example, before the bladder is inflated, the mating surface of the liner 14 can be covered with a mould release film. Additionally or alternatively, a puncture protection sheet (e.g. a rubber sheet of, for example, about 1-3 mm thickness) may be tacked to the surface of the liner in order to ensure that small discontinuities do not puncture the bladder.

When the curing is completed, the bladder 24 can be deflated to remove the assembly from the bonded joint.

The bladder 24 can be made of a relatively thick rubber material to reduce the risk of puncture. Nonetheless, in a shop floor environment it may not be possible to eliminate this risk entirely. Thus one option for avoiding explosive bursting is to expand the bladder by the injection of a liquid, rather than air. In particular, a high viscosity liquid such as grease or gel can be used, so that if the bladder is accidentally punctured, the grease or gel oozes out of the punctured region rather than bursting in all directions. Another option is to encapsulate the assembly in a compartment that is strong enough to contain the fluid burst from a punctured bladder.

Figure 3:
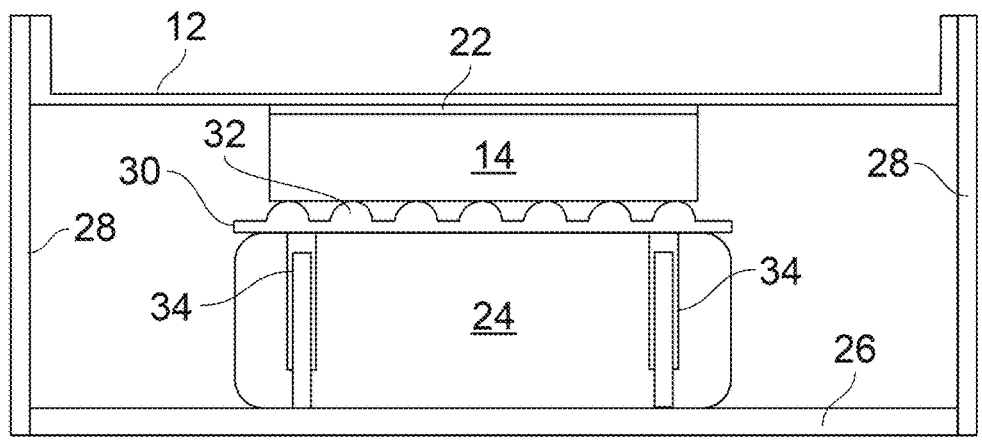
FIG. 3 shows schematically a variant of the assembly used in a method of bonding a liner to the fan casing.

FIG. 3 shows schematically a variant of the assembly used in a method of bonding a liner 14 to the fan casing 12. In the variant, a compliant layer formed conveniently by a silicon rubber sheet 30 holds an array of spaced, rigid protuberances 32. These project from the side of the sheet facing the liner 14, and concentrate the consolidating pressure exerted by the bladder 24 (or group of bladders) at the locations of the protuberances. This can help to ensure that the pressure is applied to all parts of the liner. For example, the protuberances can be metal (e.g. steel) or plastic (e.g. PTFE) spheres or hemispheres encapsulated in the rubber of the sheet.

The protuberances 32 can be shaped such that when the bladder 24 is inflated to the required pressure, only the summits of the protuberances are in touch with the liner 14. Moreover, the spacing between the protuberances can be such that they do not touch when the bladder is fully inflated. The protuberances can be hollow to reduce their weight.

The total weight of the sheet 30 and protuberances 32 may be such that the consolidating pressure prevents them from moving. However, an assembly of telescopic supports 34 extending from the sheet to the backing plate 26 may be used to support the weight.

Figure 4:
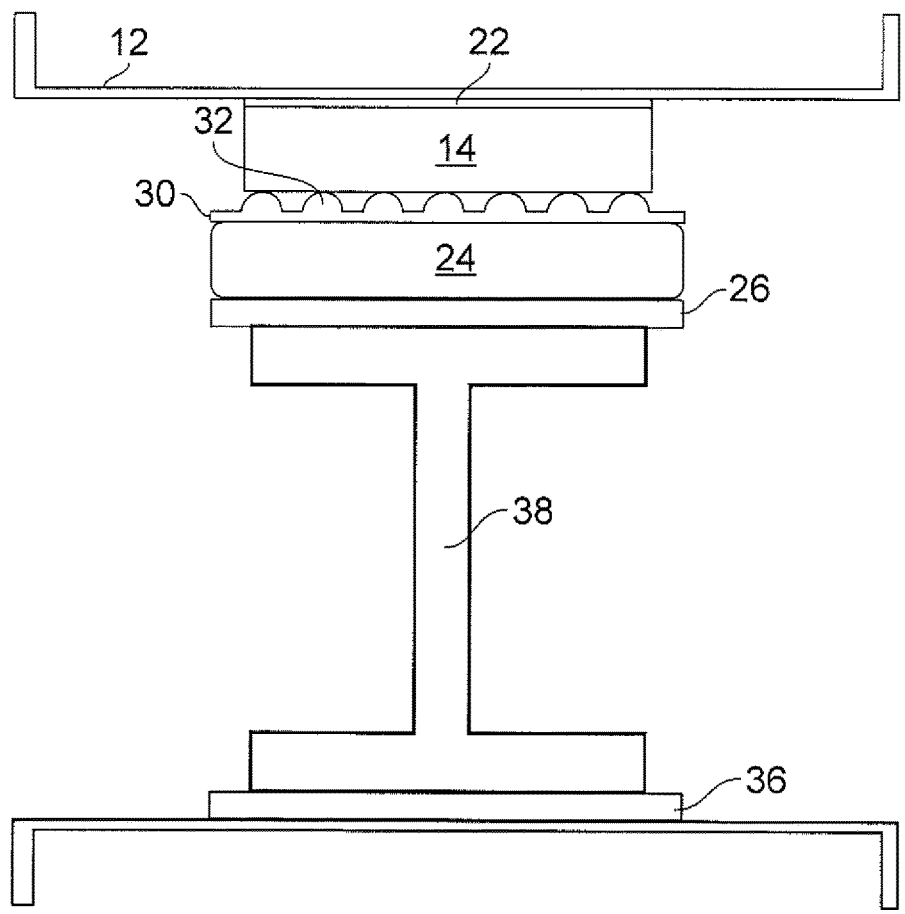
FIG. 4 shows schematically another variant of the assembly used in a method of bonding a liner to the fan casing.

FIG. 4 shows schematically another variant of the assembly used in a method of bonding a liner 14 to the fan casing 12. In the variant, a liquid-filled bladder 24 (or group of bladders) is used to exert the consolidating pressure onto the liner 14. However, rather than pressurising the bladder by forcing further fluid into it, the bladder is pressurised instead by the application of mechanical force.

More particularly, according to the method, the liner 14 (or group of liners) to be bonded are assembled and/or tacked with the curable adhesive 22 at the specified position on the fan casing 12. The bladder 24 is located against the liner, and the rigid backing plate 26 then located against the bladder. Typically a further plate 36 is placed against the opposite side of the casing 12. A jack 38 (or jacks, depending on the size of the liner) is placed between the plates and activated such that the backing plate 26 is forced against the bladder, thereby squeezing the bladder load between the backing plate 26 and the liner to exert the consolidating pressure on the liner. When curing is complete, the jack can be released and the assembly removed.

Figure 5:
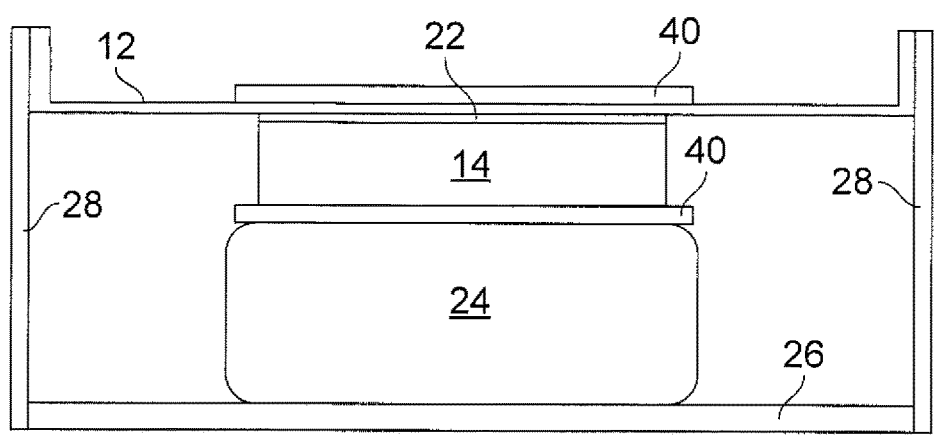
FIG. 5 shows schematically another variant of the assembly used in a method of bonding a liner to the fan casing.

A possible enhancement of the method is to include one or more heating mats in the assembly. For example, FIG. 5 shows schematically the assembly of FIG. 2 including two such mats 40. One mat is located between the liner 14 and the bladder 24, and the other is located on the opposite of the casing 12 to the liner. The mats can be tacked to the bladder and casing respectively by heat resistant polyimide tape. The combination of both these mats can ensure a controlled temperature is applied to the adhesive during curing without recourse to an oven.

The described example relates to bonding of liners to fan casings, but the method may be used for bonding other components and other geometries. For example, the method may be used to bond stacked composite prepregs to form laminated panels.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of manufacturing a component, the method comprising bonding a first component to a second component including:
   locating the first component against the second component to form an interface between the components, a curable adhesive being provided at the interface;
   locating a pressurisable, fluid-filled bladder against the first component such that the first component is sandwiched between the second component and the bladder;
   locating a backing member against the bladder such that the bladder is sandwiched between the backing member and the first component;
   pressurising the bladder such that a consolidating pressure is exerted by the bladder on the first component to conform the first component to the second component;
   curing the adhesive while the first component is conformed to the second component by the consolidating pressure; and
   locating a compliant layer between the fluid-filled bladder and the first component, the compliant layer carrying an arrangement of spaced, rigid protuberances which project from the side of the layer facing the first component, the protuberances including summits that are configured such that only the summits are in contact with the first component when the bladder is pressurized to concentrate the consolidating pressure exerted by the bladder on the first component at the locations of the protuberances.

2. The method according to claim 1, wherein the bladder is pressurised by forcing further fluid into the bladder, expansion of the bladder being constrained by the backing member.

3. The method according to claim 1, wherein the bladder is pressurised by forcing the backing member against the bladder to squeeze the bladder between the backing member and the first component.

4. The method according to claim 1, wherein one or more supports extend from the compliant layer to the backing member to hold the compliant layer in position.

5. The method according to claim 1, wherein the method further includes locating a mould release layer and/or a puncture protection sheet on the first component between the first component and the bladder.

6. The method according to claim 1, wherein the method further includes locating one or more heating mats adjacent the components, and heating the components during the curing of the adhesive using the mats.

7. The method according to claim 1, wherein the first component is an acoustic liner or an abradable liner, and the second component is a gas turbine engine fan casing.

8. A method of manufacturing a gas turbine engine comprising manufacturing one or more components using the method according to claim 1.

9. A method of bonding a first component to a second component, the method comprising:
   locating the first component against the second component to form an interface between the components, a curable adhesive being provided at the interface;
   locating a pressurisable, fluid-filled bladder against the first component such that the first component is sandwiched between the second component and the bladder;
   locating a backing member against the bladder such that the bladder is sandwiched between the backing member and the first component;

pressurising the bladder such that a consolidating pressure is exerted by the bladder on the first component to conform the first component to the second component;

curing the adhesive while the first component is conformed to the second component by the consolidating pressure; and supporting a weight of a compliant layer between the fluid-filled bladder and the first component with one or more telescoping supports that extend from the compliant layer to the backing member.

* * * * *